United States Patent
Reiswig

(10) Patent No.: US 9,026,439 B2
(45) Date of Patent: May 5, 2015

(54) VERBAL INTELLIGIBILITY ANALYZER FOR AUDIO ANNOUNCEMENT SYSTEMS

(75) Inventor: Rodger Reiswig, Apopka, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 467 days.

(21) Appl. No.: 13/432,327

(22) Filed: Mar. 28, 2012

(65) Prior Publication Data

US 2013/0262103 A1 Oct. 3, 2013

(51) Int. Cl.
| | |
|---|---|
| G10L 15/20 | (2006.01) |
| G10L 25/60 | (2013.01) |
| H04R 29/00 | (2006.01) |
| G10L 15/26 | (2006.01) |
| H04R 27/00 | (2006.01) |

(52) U.S. Cl.
CPC .............. G10L 25/60 (2013.01); *G10L 15/26* (2013.01); *H04R 27/00* (2013.01); H04R 29/007 (2013.01); *H04R 2227/009* (2013.01)

(58) Field of Classification Search
CPC ..... G10L 21/0208; G10L 21/06; G10L 25/69; G10L 13/04; G10L 13/08; G10L 13/07; G10L 15/265; G10L 15/22; G10L 15/16; G10L 15/0205; H04R 25/30; H04R 29/007; H04R 2227/009; H04R 29/004; H04R 25/70
USPC ............. 704/270, 270.1, 225, 233, 209, 226; 381/57, 60, 58, 82, 94.1, 94.7, 93
See application file for complete search history.

(56) References Cited

U.S. PATENT DOCUMENTS

| | | | | |
|---|---|---|---|---|
| 5,185,848 | A * | 2/1993 | Aritsuka et al. | 704/202 |
| 5,459,813 | A * | 10/1995 | Klayman | 704/209 |
| 5,790,671 | A * | 8/1998 | Cooper | 381/57 |
| 5,966,639 | A * | 10/1999 | Goldberg et al. | 455/11.1 |
| 6,035,048 | A * | 3/2000 | Diethorn | 381/94.3 |
| 6,201,960 | B1 * | 3/2001 | Minde et al. | 455/424 |
| 6,766,142 | B2 * | 7/2004 | King | 455/63.1 |
| 6,792,404 | B2 * | 9/2004 | Jacob | 704/228 |
| 7,433,821 | B2 * | 10/2008 | Obranovich et al. | 704/270 |
| 7,702,112 | B2 * | 4/2010 | Obranovich et al. | 381/58 |
| 8,103,007 | B2 * | 1/2012 | Shields et al. | 381/57 |
| 8,195,453 | B2 * | 6/2012 | Cornell et al. | 704/226 |
| 8,204,742 | B2 * | 6/2012 | Yang et al. | 704/209 |
| 8,238,564 | B2 * | 8/2012 | Revit et al. | 381/60 |
| 2002/0099551 | A1 * | 7/2002 | Jacob | 704/270 |
| 2002/0131604 | A1 * | 9/2002 | Amine | 381/58 |
| 2005/0216263 | A1 * | 9/2005 | Obranovich et al. | 704/233 |
| 2007/0147625 | A1 * | 6/2007 | Shields et al. | 381/57 |
| 2007/0192098 | A1 * | 8/2007 | Zumsteg et al. | 704/240 |

(Continued)

*Primary Examiner* — Vijay B Chawan
(74) *Attorney, Agent, or Firm* — Kacvinsky Daisak Bluni PLLC

(57) ABSTRACT

A device and method are disclosed for testing the intelligibility of audio announcement systems. The device may include a microphone, a translation engine, a processor, a memory associated with the processor, and a display. The microphone of the analyzer may be coupled to the translation engine, which in-turn may be coupled to the processor, which is in-turn may be coupled to the memory and the display. The translation engine can convert audio speech input from the microphone into data output. The processor can receive the data output and can apply a scoring algorithm thereto. The algorithm can compare the received data against data that is stored in the memory of the analyzer and calculates the accuracy of the received data. The algorithm may translate the calculated accuracy into a standardized STI intelligibility score that is then presented on the display of the analyzer.

22 Claims, 3 Drawing Sheets

(56) References Cited

U.S. PATENT DOCUMENTS

| | | | |
|---|---|---|---|
| 2008/0077386 A1* | 3/2008 | Gao et al. | 704/3 |
| 2009/0074195 A1* | 3/2009 | Cornell et al. | 381/58 |
| 2009/0319268 A1* | 12/2009 | Aumont et al. | 704/236 |
| 2010/0268539 A1* | 10/2010 | Xu et al. | 704/260 |
| 2011/0066428 A1* | 3/2011 | Yang et al. | 704/225 |

* cited by examiner

VERBAL INTELLIGIBILITY ANALYZER FOR AUDIO ANNOUNCEMENT SYSTEMS

FIELD OF THE DISCLOSURE

This invention relates generally to audio announcement systems, and more particularly to a device and method for testing the intelligibility of an audio announcement system within a building or structure using unobtrusive, audio test messages.

BACKGROUND OF THE DISCLOSURE

It is well established that speech that is projected or transmitted into a region, area, or space is not necessarily intelligible simply because it is can be heard within the space. It is common for speech projected within particular buildings or structures, such as sports stadiums, airports, or office buildings, to be loud enough to be heard by human listeners yet still be unintelligible. Unintelligibility of audible speech can result from a variety of factors, including, but not limited to, background noise, the quality of an audio system over which the speech is broadcast, and the architecture of a structure into which the speech is projected. For example, a room having a certain shape or configuration can cause excessive reverberation of sound therein, thereby garbling and diminishing the intelligibility of a projected speech message.

The intelligibility of broadcast speech should be taken into consideration in the implementation of audio announcement systems in general, and especially those systems that are associated with fire safety and building monitoring. The intelligibility of such systems are of particular concern because they may be responsible for transmitting warnings, notifications, and instructions relating to situations and conditions that are potentially hazardous to human life.

Over the past several decades, quantitative methods have been developed for testing the intelligibility of announcement systems in a manner that provides a greater degree of reliability and repeatability than previous, subjective methods. These quantitative methods typically employ a standardized Speech Transmission Index (STI) that facilitates evaluation of speech intelligibility without any need for subjective, human interpretation of transmitted speech. STI-type testing is typically administered by specially-trained technicians and involves playing amplitude-modulated noise signals through an audio announcement system that is being tested, such as by projecting the noise signals through one or more loud speakers that are part of the announcement system. The noise signals are detected by a specialized testing device that is carried through regions, areas, or spaces into which the noise signals are projected. The testing device analyzes the test signals by comparing the depth of modulation thereof with that of a substantially identical test signal that is stored locally in the device's memory. Relative reductions in modulation depth of the received signals compared to the stored signals are associated with a loss of intelligibility.

The above-described evaluation process yields a numerical, STI intelligibility score in a range between 0 and 1 with which announcement systems are graded. A score of 0 indicates complete unintelligibility and a score of 1 indicates perfect intelligibility. In order for an audio announcement system to be considered acceptable, the National Fire Protection Association (NFPA) requires that at least 90 percent of the measurement locations within a building have an STI score of not less than 0.45 and an average STI score of not less than 0.50 (NFPA 72, 2010, Annex D).

A problem that is commonly associated with conventional, STI-type intelligibility tests is that the noise signals that are necessarily injected into and played through announcement systems during such testing are extremely intrusive and aggravating to humans. As a result, intelligibility tests are typically only performed in buildings and structures when they are unoccupied, such as after work hours or prior to a tenant moving into a space. This presents a problem, because intelligibility tests that are performed in unoccupied and/or unfurnished structures can yield results that are highly inaccurate relative to actual operating conditions, wherein background noise that is generated by occupants and equipment can have a significant impact on an announcement system's intelligibility. Still worse, in some cases intelligibility testing is often completely forgone in facilities that are continuously occupied, such as hotels and hospitals.

SUMMARY

In view of the forgoing, the disclosed system and method can enable testing the intelligibility of audio announcement systems, and fire alarm and emergency communications systems in particular, in a manner that is not intrusive or aggravating to human occupants of a building. The disclosed system and method can also incorporate Speech Transmission Index scoring methodology in order to comport with recognized intelligibility rating standards. The disclosed system and method can be administered by laymen, without the assistance of specially-trained technicians.

In accordance with the disclosure, a system and method are provided for facilitating verbal intelligibility testing of audio announcement systems. The system may be embodied by a portable, verbal intelligibility analyzer that generally includes a microphone, a translation engine, a processor, a memory associated with the processor, and a display. The microphone of the analyzer can be coupled to the translation engine, which in-turn can be coupled to the processor, which in-turn can be coupled to the memory and the display of the analyzer.

The translation engine of the analyzer can operate in a conventional manner to convert audio speech input from the microphone into data output. The processor can receive as input the data output from the translation engine and can apply an algorithm thereto. In one embodiment, the algorithm compares the received data against data that is stored in the memory of the analyzer and that is representative of a test message that is expected to be received. In performing this comparison, the algorithm may evaluate the accuracy of the received data and may generate an accuracy score in the form of a percentage. Finally, the algorithm may translate the calculated accuracy score into a standardized STI intelligibility score that can be presented on the display of the analyzer.

After the analyzer has received and scored one or more audio messages in the manner described above, the data generated by the translation engine and the scoring algorithm may be stored in the memory of the analyzer and made available for manual or automatic upload to another computing device for further processing and/or evaluation.

When using the analyzer to evaluate the intelligibility of an audio announcement system in a particular building, an operator may carry the analyzer to a desired testing location within the building. The operator may select a testing location that is representative of an area within the building that is typically occupied by individuals.

A verbal audio message that corresponds to a test message expected to be received by the analyzer may be injected into the audio announcement system and projected through the speakers of the announcement system. This can be accomplished by playing an .mp3 or other audio file containing the selected audio message through a speaker of a portable music player that is positioned in close proximity to the microphone of the announcement system.

The audio message projected from the speakers of the announcement system may be received by a microphone of the analyzer and transmitted to the translation engine. The translation engine can convert the audio message into an electrical signal, sound wave profile, or text data and communicate the data to the processor, which in-turn can process the data and generate scoring information in the manner described above. The STI score generated by the processor can be presented to the operator on the display of the analyzer.

The testing steps described above may be repeated for every desired testing location within a building or other location.

The intelligibility testing device disclosed herein can thus include an audio input device and a translation engine coupled to the audio input device and configured to receive audio data from the audio input device and to convert the received audio data to output data. The device can further include a processor coupled to the translation engine and configured to receive the output data from the translation engine and to compare the received output data to stored test data to generate scoring data, and a storage medium coupled to the processor for storing the test data.

The intelligibility testing method disclosed herein can thus include receiving audio data, converting the received audio data to output data, comparing the output data to stored test data, and generating an intelligibility score representative of an intelligibility characteristic of the received audio data.

By implementing the device and method steps described above, virtually any individual, not only those that trained in intelligibility testing, can effectuate an intelligibility test of an audio announcement system using verbal audio messages that are not intrusive or aggravating to occupants of a building or space. Intelligibility tests can therefore be conducted during a building's regular operating hours when the building is occupied and furnished, thereby facilitating the acquisition of intelligibility scores that are more accurate than those yielded by previous testing devices and methods.

BRIEF DESCRIPTION OF THE DRAWINGS

By way of example, a specific embodiment of the disclosed device will now be described, with reference to the accompanying drawings, in which.

DETAILED DESCRIPTION

Figure 1:
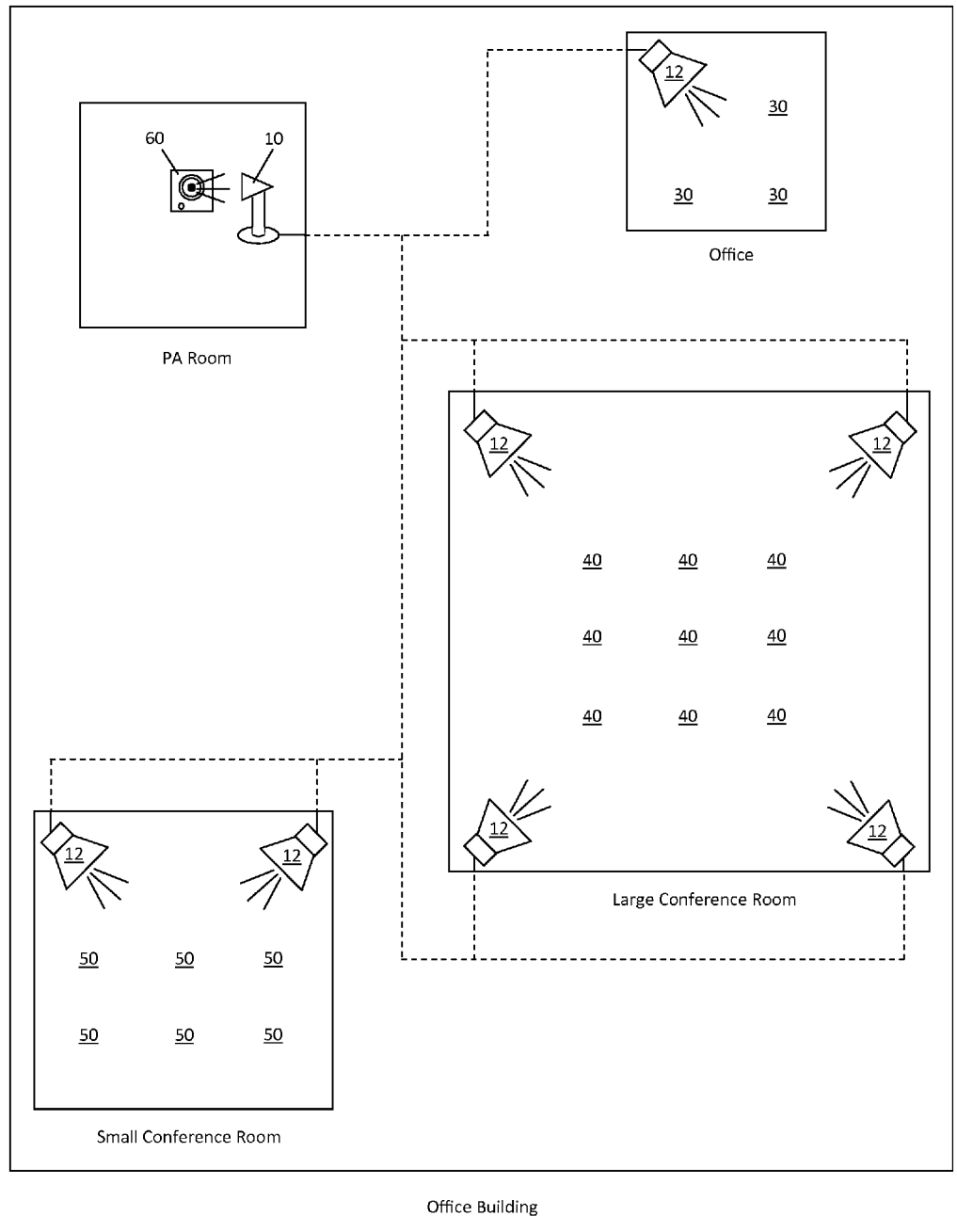
FIG. 1 is a schematic of an exemplary audio announcement system in an office building.

Referring to FIG. 1, a schematic of an exemplary audio announcement system in an office building is presented. The announcement system is of a variety that is provided for facilitating the auditory dissemination of notifications, warnings, and other information throughout a structure. Those of ordinary skill in the art will appreciate that the depicted announcement system is merely representative of an exemplary announcement system and that the embodiments of the disclosed system and method can utilize any of a variety of different announcement systems.

Several rooms of the office building are depicted in FIG. 1, including a public announcement (PA) room, an office, a large conference room, and a small conference room. It is to be understood that the office building may include many additional rooms and areas that are not depicted, including, but not limited to, additional offices and conference rooms, hallways, bathrooms, store rooms, and a cafeteria. It should also be understood that the office building is depicted by way of example only, and that the announcement system can be located in any other type of building or structure in which audio announcement systems are typically found, including, but not limited to, sports stadiums, hospitals, hotels, schools, and department stores. In addition, it will be appreciated that the disclosed system and method are not limited to use in buildings, but can also find application for analyzing intelligibility of outdoor announcement systems.

The audio announcement system generally includes an audio input device 10 operatively connected to a plurality of audible notification devices 12 that are distributed throughout the office building. The audio input device 10 depicted in FIG. 1 is a microphone. However, it is contemplated that any device that can receive or generate a live or prerecorded verbal audio message for injection into the announcement system can be substituted for the microphone 10. For example, it is contemplated that the audio input device 10 can additionally or alternatively include a compact disc player, a digital video disc player, a Blu-ray player, an mp3 player, or a computer workstation that is capable of playing some or all of aforementioned media formats as well as many others (e.g. .wav, .wma, .aiff, .acc, etc.). It is further contemplated that the audio input device 10 can be located within the office building, or it could be located outside of the office building, such as at a remote message-dispatch center or other facility.

The audible notification devices 12 of the announcement system may be speakers. Although the illustrated embodiment shows the speakers 12 as being hardwired to the audio input device 10, it will be appreciated that the speakers 12 can alternatively be connected to the input device 10 using various wireless communication methods. For example, the speakers 12 can be linked to the input device 10 using conventional radio, Wi-Fi, or Bluetooth communication. In addition, although the illustrated embodiment shows the speakers 12 as being hardwired directly to the input device 10, it is contemplated that the speakers 12 can alternatively be hardwired, or wirelessly connected, to a circuit that is separate from the input device 10.

Figure 2:
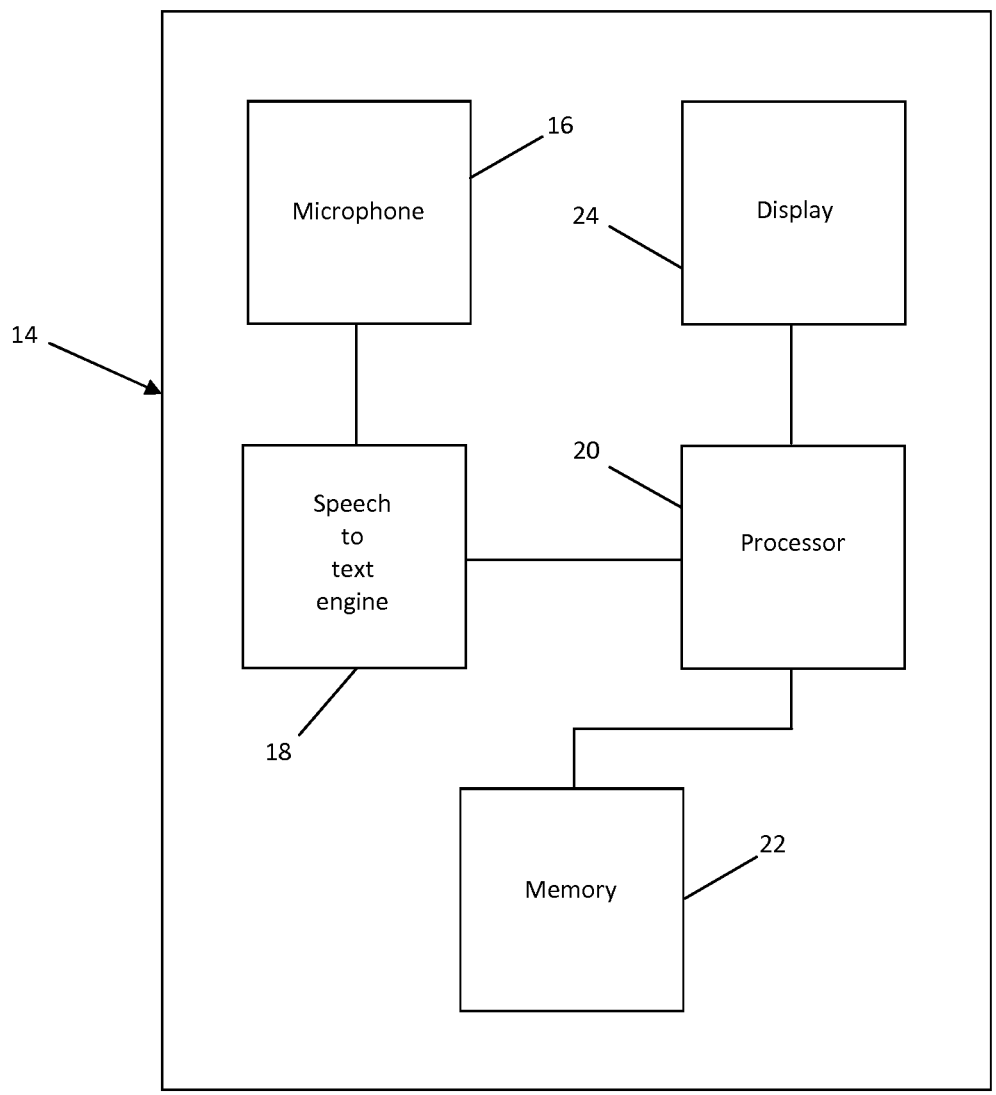
FIG. 2 is a schematic of the disclosed audio intelligibility analyzer.

Referring to FIG. 2, a schematic representation of the disclosed verbal intelligibility analyzer 14 is depicted. The analyzer 14 can be a portable, battery-powered unit, preferably having a size, shape, and weight that facilitates convenient, handheld transport of the analyzer 14 about a building by an operator. Alternatively, it is contemplated that the analyzer 14 can be larger and/or heavier and transported on a cart or other conveyance device. The particular physical embodiment of analyzer 14 is not critical and can be varied greatly without departing from the spirit and scope of the disclosure.

The analyzer 14 can include a microphone 16, a translation engine 18, a processor 20, a storage medium (memory) 22 associated with the processor 20, and a display 24. The translation engine 18 is depicted as taking input from the microphone 16 and providing output to the processor 20, which is in-turn operatively connected to the display 24 and the memory 22. It will be appreciated, however, that this arrangement is merely representational, and that the actual connection scheme between the components of the analyzer 14 may be varied without departing from the disclosure. For example, it is contemplated that the translation engine 18 can be a software program running on the processor 20.

The translation engine 18 of the analyzer 14 may convert audio speech input from the microphone 16 into data output, such as electrical signal output, sound wave profile output, or text output. For example, the translation engine 18 can be any of a variety of commercially available speech-to-text systems, including those marketed under the Dragon® Speech Recognition Software name, as well as systems offered by Microsoft®. For example, an embodiment of the invention is contemplated in which a Microsoft® Speech SDK 5.1 software development kit is used to implement the translation engine 18.

The processor 20 of the analyzer 14 may receive as input the data output from the translation engine 18 and may apply an algorithm to compare the received data against data stored in the memory 22 of the analyzer 14 (e.g. by calculating a derivation from the stored data). In one embodiment, the data stored in memory is representative of an audio test message that is expected to be received. For example, several different prerecorded audio test messages can be prepared prior to testing, with each test message having particular consonant and vowel characteristics to ensure testing of a broad range of frequencies and harmonics within the message. Prior to playing a particular one of the prerecorded test messages during testing (as further described below) the analyzer 14 can be set to listen for that particular message, thereby facilitating a proper comparison between corresponding played and stored messages. Providing several different audio messages to play during testing allows testing to be performed without inhabitants in a building becoming aggravated or fatigued from having to repeatedly listen to a single audio message.

In comparing the played and stored test messages, the accuracy of the received data may be evaluated relative to the stored test data and may generate an accuracy score in the form of a percentage. For example, if the expected audio test message stored in the memory 22 is "THIS IS ONLY A TEST" and the received data contains the message "THIS IS MONEY A TEST," then only four out of five words in the message were translated correctly, yielding an accuracy score of 80%. In some embodiments greater weight can be assigned to words that are longer, contain more syllables, or that are generally more difficult for a listener to understand. Finally, the calculated accuracy score may be translated into a standardized STI intelligibility score that is presented on the display 24 of the analyzer 14. In the above example, an accuracy score of 80% would translate into an STI score of 0.50.

An embodiment is contemplated in which the processor 20 also records the physical location of the analyzer 14 when an intelligibility test is conducted and associates that location with the translated message and scoring data generated by the same test. Such location data can be provided by any well-known geo-location techniques, such as various different Global Positioning Satellite (GPS) devices and technologies that can be externally linked to the analyzer 14 or incorporated as an onboard component of the analyzer 14. Alternatively, it is contemplated that the location data can be manually provided by an operator in the form of coordinates or informal notes (e.g. "center of large conference room").

After the analyzer 14 has received and scored one or more messages in the manner described above, the data generated by the translation engine 18 and the scoring algorithm may be stored in the memory 22 of the analyzer 14 and may be made available for manual or automatic upload to another computing device. For example, the data can be manually or automatically uploaded to a laptop computer or a tablet computer via Universal Serial Bus (USB), wireless or other connection. In another embodiment, the data can be manually or automatically transmitted to a local (i.e. onsite) or remote (i.e. offsite) workstation via wireless communication means, including, but not limited to, Wi-Fi or Bluetooth connection. The data are thereby made available for further processing and evaluation, such as, for example, mapping the recorded intelligibility scores onto a visual depiction of the various areas of a tested building.

Figure 3:
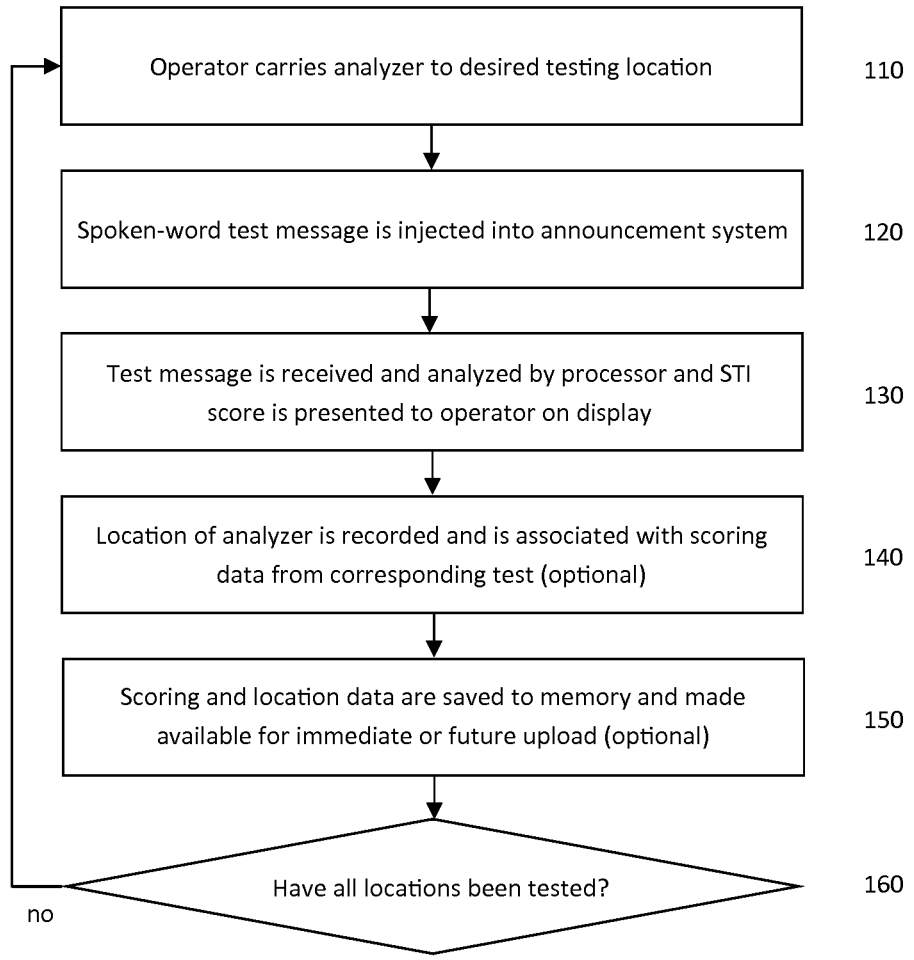
FIG. 3 is a process flow diagram illustrating an exemplary method of using the disclosed audio intelligibility analyzer.

Referring to FIG. 3, a method for using the disclosed analyzer 14 will be described in relation to the audio announcement system shown in FIG. 1. It will be appreciated, however, that the analyzer 14 can be used to test virtually any type of audio system capable of projecting a speech message, and can even be used to test the intelligibility of a live, human speaker without the use of an audio announcement system or other amplification means.

Initially, at step 100, an operator may carry the analyzer 14 to a location where he or she wishes to conduct a first intelligibility test of the announcement system. Referring to FIG. 1, the selected location could be any of the depicted locations 30 in the office, any of the depicted locations 40 in the large conference room, or any of the depicted locations 50 in the small conference room. It is to be understood that these particular locations are shown by way of example only, and that an operator could select any physically accessible location within a particular structure, or outside a structure (e.g., a courtyard). Naturally, larger spaces will generally provide a greater number of available testing locations and smaller spaces will generally provide fewer. An operator may select testing locations that are representative of areas within a structure that are typically occupied by individuals, such as behind desks in an office building, in the beds of a hotel, or in the bleachers and bathrooms of a sports stadium.

At step 120, an audio message that corresponds to a message that is expected to be received by the analyzer 14 can be injected into the audio announcement system. This can be accomplished by playing an .mp3 or other audio file containing the selected audio message through the speaker(s) of a portable music player 60 (see FIG. 1) that is positioned in close proximity to the microphone 10 of the announcement system. As discussed above, the audio message can be injected into the announcement system in a variety of other ways, including, but not limited to, a live, human speaker speaking the message into the microphone, or executing an appropriate sound file on a computer workstation that is directly connected (via wired or wireless means) to the audio announcement system. Once injected, the audio message is transmitted to, and is projected from, the speakers 12 of the announcement system.

It is contemplated that the injection of the verbal audio message into the audio announcement system can be effectuated in a variety of different ways. For example, once an operator arrives at a desired testing location within a building, the operator can indicate that he is ready for testing to begin by using a cell phone or walkie talkie to relay such information to a second operator located adjacent the audio playing device 60 who then manually plays the message. Alternatively, the operator may be able to control the audio playing device 60 using a remote control or other wired or wireless control means. It is further contemplated that control of the audio playing device can be integrated into the circuitry of the analyzer 14 and that the audio message can be initiated by pressing a button labeled "TEST" or by manipulating a similar operator interface on the analyzer 14. In any of the above examples, it is contemplated that a test message can be played only into a particular room or area of a building that is being tested so that occupants outside of that room or area are not unnecessarily made to listen to the message.

Next, at step 130, the projected audio message may be received by the microphone 16 of the analyzer 14 and may be converted into an electrical signal that is transmitted to the translation engine 18. The translation engine 18 may then translate the audio message in the manner described above (e.g. into an electrical signal, sound wave profile, text data, etc.) and communicate corresponding output data to the processor 20, which in-turn processes the data and generates scoring information in the manner described above.

The STI score generated by the processor 20 may then be presented to the operator on the display 24 of the analyzer 14. It is contemplated that a transcribed text message may also be presented to the operator on the display 24 (i.e. if the translation engine 18 is a speech-to-text engine that outputs such a transcribed message), with or without accompanying accuracy data, such as which words, or parts of words, were transcribed correctly and/or what percentage of words were transcribed correctly. In an alternative embodiment, a display may be eliminated and the STI score can be presented to the operator as an audible signal. In another alternative embodiment, no visual or audible feedback may be provided to the operator; rather the intelligibility data may simply be stored by the analyzer 14 and/or uploaded to another device (immediately or at a later time via wired or wireless communication) for analysis in the manner described above. The time at which the STI score is evaluated may be also be recorded and stored in association with the test data.

At optional step 140, the physical location of the analyzer 14 may be recorded and associated with the scoring data. At optional step 150, the scoring data and associated location (if recorded) may be saved to the memory 22 of the analyzer 14 and may be made available for immediate or future automatic or manual upload to another computing device.

Finally, at step 160, the evaluation can be concluded if the operator has visited and tested all desired testing locations within the building. Alternatively, if one or more additional testing locations remain, the operator can proceed to the next such location and conduct another test in accordance with the steps described above.

Some embodiments of the disclosed device and method may be implemented, for example, using a storage medium, a computer-readable medium or an article of manufacture which may store an instruction or a set of instructions that, if executed by a machine, may cause the machine to perform a method and/or operations in accordance with embodiments of the disclosure. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory (including non-transitory memory), removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

As used herein, an element or step recited in the singular and proceeded with the word "a" or "an" should be understood as not excluding plural elements or steps, unless such exclusion is explicitly recited. Furthermore, references to "one embodiment" in the following disclosure are not intended to be interpreted as excluding the existence of additional embodiments that also incorporate the recited features. The term computer is not limited to just those integrated circuits referred to in the art as computers, but broadly refers to, microprocessors, microcontrollers, microcomputers, programmable logic controllers, application specific integrated circuits, and other programmable circuits, and these terms are used interchangeably herein.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

The invention claimed is:

1. An intelligibility testing device comprising:
an audio input device;
a translation engine coupled to the audio input device and configured to receive audio data from the audio input device and to convert the received audio data to output data;
a processor coupled to the translation engine and configured to receive the output data from the translation engine and to compare the received output data to stored test data to generate an accuracy score representing an accuracy of the output data relative to the test data; and
a storage medium coupled to the processor for storing the test data.

2. The intelligibility testing device of claim 1, further comprising a location detector for detecting and recording a location of the testing device and associating the recorded location with scoring data generated by the processor.

3. The intelligibility testing device of claim 1, further comprising a remotely-located audio playing device that is controlled through manipulation of an operator interface that is integral with the testing device.

4. The intelligibility testing device of claim 3, wherein the operator interface allows an operator to specify a particular area into which an audio message is played.

5. The intelligibility testing device of claim 1, further comprising an output component adapted to upload data from the testing device to another computing device.

6. The intelligibility testing device of claim 1, further comprising a scoring algorithm configured to compare the output data to the test data stored in the storage medium and to generate the accuracy score.

7. The intelligibility testing device of claim 6, wherein the scoring algorithm is configured to convert the accuracy score to an STI intelligibility score.

8. The intelligibility testing device of claim 1, further comprising a display coupled to the processor for visually presenting the scoring data.

9. The intelligibility testing device of claim 1, wherein the translation engine is a speech-to-text engine and the output data is text data.

10. A method of testing intelligibility, comprising:
receiving audio data;
converting the received audio data to output data;
comparing the output data to stored test data; and
generating an intelligibility score representative of an intelligibility characteristic of the received audio data, wherein the intelligibility score is derived from an accuracy of the output data relative to the test data.

11. The method of claim 10, further comprising recording a location where the audio data was received and associating the recorded location with the intelligibility score.

12. The method of claim 10, further comprising projecting an audio message through an audio announcement system.

13. The method of claim 12, further comprising injecting the audio message into the audio announcement system by playing the message through a speaker of an audio playing device positioned in close proximity to a microphone of the audio announcement system.

14. The method of claim 12, further comprising injecting the audio message into the audio announcement system by speaking the message into a microphone of the audio announcement system.

15. The method of claim 12, further comprising injecting the audio message into the audio announcement system by executing an audio file containing the message on an audio playing device that is connected directly to the audio announcement system.

16. The method of claim 12, wherein the step of projecting comprises projecting the audio message into a designated space.

17. The method of claim 10, wherein the accuracy of the output data relative to the test data is determined by at least one scoring algorithm, and wherein the method further comprises storing data generated by said at least one scoring algorithm in a non-volatile storage medium.

18. The method of claim 10, wherein the accuracy of the output data relative to the test data is determined by at least one scoring algorithm, and wherein the method further comprises uploading data generated by said at least one scoring algorithm to another computing device.

19. The method of claim 10, wherein the step of comparing the output data to stored test data comprises comparing the output data to test data that is representative of a predetermined audio test message.

20. The method of claim 19, further comprising generating an accuracy score representative of the comparison.

21. The method of claim 20, further comprising converting the accuracy score to an STI intelligibility score.

22. The method of claim 21, further comprising visually displaying the STI intelligibility score.

* * * * *